(12) United States Patent
Xiang et al.

(10) Patent No.: US 12,111,771 B2
(45) Date of Patent: Oct. 8, 2024

(54) AGGREGATING BLOCK MAPPING METADATA TO IMPROVE LINKED CLONE READ PERFORMANCE

(71) Applicant: VMware LLC, Palo Alto, CA (US)

(72) Inventors: Enning Xiang, San Jose, CA (US); Wenguang Wang, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/384,298

(22) Filed: Jul. 23, 2021

(65) Prior Publication Data

US 2023/0023307 A1    Jan. 26, 2023

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC ............ G06F 12/0292; G06F 2201/84; G06F 16/128; G06F 16/2246; G06F 16/9027; G06F 3/0688; G06F 2212/7201; G06F 12/10
USPC ...... 711/206, 207, 200, 205, 12.001, 12.014, 711/12.058, 12.061, 12.007, 12.066
See application file for complete search history.

(56) References Cited

U.S. PATENT DOCUMENTS

| | | | |
|---|---|---|---|
| 8,423,733 B1* | 4/2013 | Ozdemir | G06F 3/067 711/E12.028 |
| 10,733,165 B1* | 8/2020 | Broad | G06F 9/5038 |
| 11,099,940 B1* | 8/2021 | Patel | G06F 11/1469 |
| 2011/0185253 A1* | 7/2011 | Resch | G06F 11/1076 714/755 |
| 2014/0337686 A1* | 11/2014 | Baptist | G06F 11/1448 714/763 |
| 2017/0315878 A1* | 11/2017 | Purohit | G06F 11/1458 |
| 2019/0213085 A1* | 7/2019 | Alluboyina | G06F 3/0665 |
| 2022/0027059 A1* | 1/2022 | Chen | G06F 3/0689 |

\* cited by examiner

*Primary Examiner* — Yaima Rigol
*Assistant Examiner* — Edward Waddy, Jr.
(74) *Attorney, Agent, or Firm* — King Intellectual Asset Management

(57) ABSTRACT

Linked clone read performance (e.g., retrieving data) is improved at least by minimizing the number of input/output (I/O) operations. For a child clone, a local logical extent and an inherited logical extent are generated. The local logical extent comprises a logical block address (LBA) for data in a data region of the child clone and a physical sector address (PSA) corresponding to the LBA for the data in the data region of the child clone. The inherited logical extent spans logical extents that are accessible to the child clone. The inherited logical extent comprises an LBA for data in a data region of an ancestor of the child clone and a corresponding identifier (ID) of the ancestor. Data for an LBA in a read request may be rapidly found in the child clone (local logical extent) or an ancestor (inherited logical extent).

20 Claims, 14 Drawing Sheets

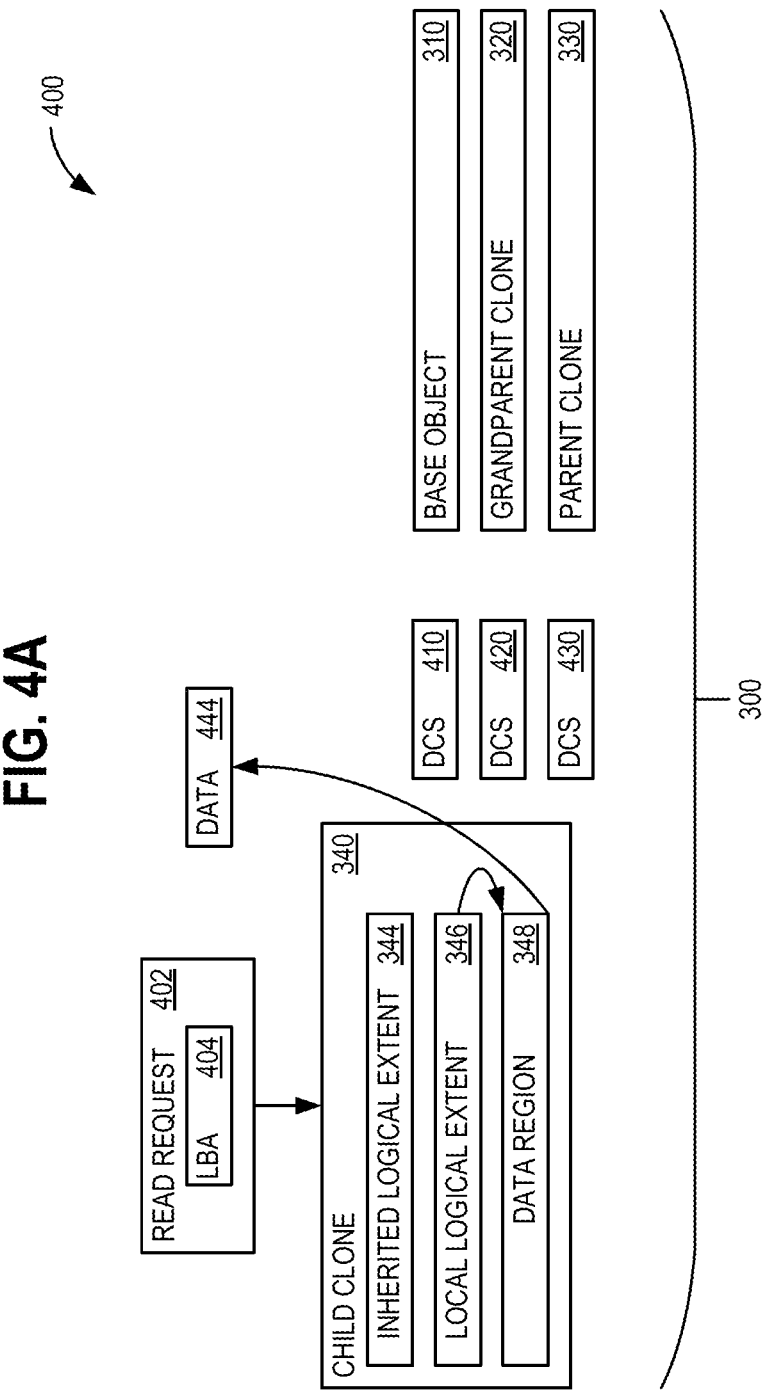

AGGREGATING BLOCK MAPPING METADATA TO IMPROVE LINKED CLONE READ PERFORMANCE

BACKGROUND

Virtualization leverages multiple objects for performance and reliability, including virtual machines (VMs) or other virtualized computing instances, snapshots, and clones. A VM functions in a virtual environment as a virtual computer system with its own processor, memory, network interface, and storage, while the virtual environment itself executes and is stored on a physical hardware system. In some examples, a snapshot is a capture of the state of a VM at a given time, and may be used for error recovery (e.g., restoration of the VM after a crash or physical hardware system failure) or for other purposes. In some examples, a clone is a copy of a VM that is able to execute on its own as a separate VM and has its own VM disk (VMDK) object and its own set of snapshots. Whereas clones are complete copies of a VM, snapshots may be limited to differences from a prior snapshot (e.g., capturing only what has changed for the VM since the prior snapshot—except for the first snapshot, which should be a complete copy). Clones may be created from base VMs or other clones (e.g., clone VMs), and may be created directly from a functioning VM or by assembling a complete set of snapshots for a VM.

Cloning a VM provides a convenient way to rapidly increase the number of VMs available to a user, because copying an existing VM as-is (e.g., cloning) precludes the need to configure an entirely new base VM. Clones may be either stand-alone or linked to form a clone tree. A stand-alone clone may have performance similar to the VM from which it was copied, whereas linked clones typically introduce a tradeoff, due to shared storage. That is, linked clones may incur a performance penalty in exchange for conserving storage space. One aspect of the potential performance degradation is that when a read request comes into a linked clone, if the logical block address (LBA) identified in the read request is not within the data region of that particular linked clone (which initially receives the read request), the data regions of other linked clones are searched until that LBA is located. In a worst-case scenario, all of the linked clones in a clone tree must be searched until the LBA is located in the final linked clone in the tree that is searched. With this arrangement, the performance penalty may grow linearly with the size of the clone tree (e.g., the number of linked clones). This linear penalty growth presents a technical problem that may result in an unfavorable user experience: either the number of available linked clones is limited, or read performance may be slow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for improving linked clone read performance when retrieving data from a clone that include: generating a child clone; generating a logical map for the child clone, the logical map for the child clone comprising: a local logical extent comprising a logical block address (LBA) for data in a data region of the child clone and a physical sector address (PSA) corresponding to the LBA for the data in the data region of the child clone, and an inherited logical extent spanning logical extents that are accessible to the child clone, the inherited logical extent inherited from a first ancestor of the child clone and comprising an LBA for data in a data region of the first ancestor of the child clone and a corresponding identifier (ID) of the ancestor; receiving a read request having a read request LBA; determining whether the read request LBA corresponds to the LBA in the local logical extent; based on at least determining that the read request LBA corresponds to the LBA in the local logical extent, returning the data from the data region of the child clone; based on at least determining that the read request LBA does not correspond to the LBA in the local logical extent, determining whether the read request LBA corresponds to the LBA in the inherited logical extent; and based on at least determining that the read request LBA corresponds to the LBA in the inherited logical extent, returning the data from the data region of the ancestor.

BRIEF DESCRIPTION OF THE DRAWINGS

The present description will be better understood from the following detailed description read in the light of the accompanying drawings, wherein:

FIGS. 4A-4C illustrate scenarios of reading data from the clone tree of FIG. 3;

DETAILED DESCRIPTION

Figure 1:
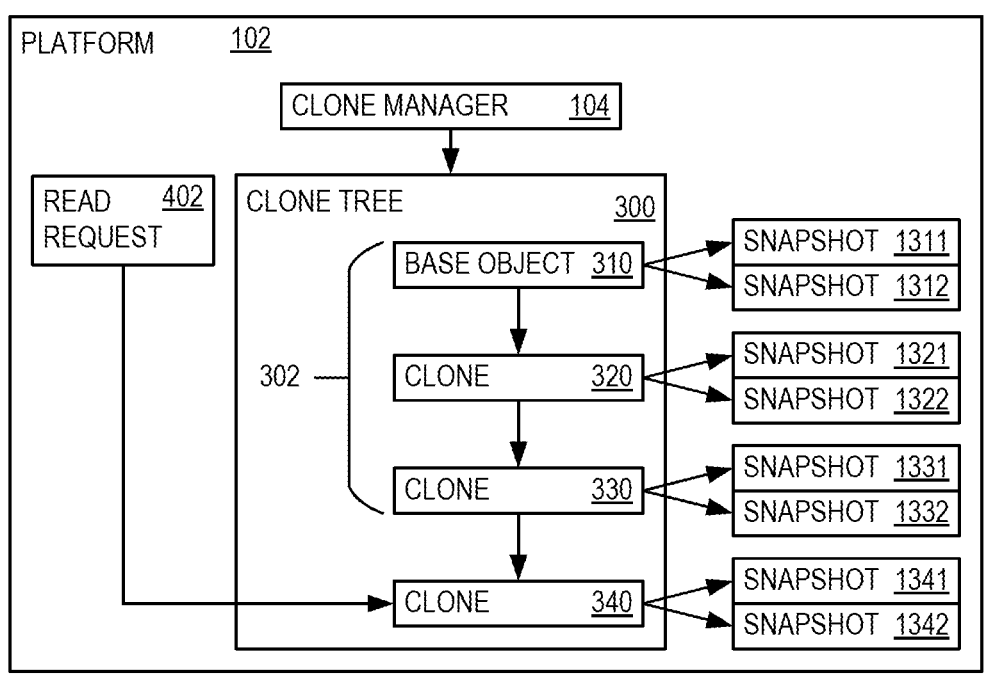
FIG. 1 illustrates an architecture that may advantageously improve linked clone read performance.

Aspects of the disclosure improve linked clone read performance (e.g., retrieving data from a clone) at least by minimizing the number of input/output (I/O) operations according to a technical solution presented herein. This may be accomplished at least by generating, for a child clone, a single logical map comprising a local logical extent and an inherited logical extent. The local logical extent comprises a logical block address (LBA) for data in a data region of the child clone and a physical sector address (PSA) corresponding to the LBA for the data in the data region of the child clone. The inherited logical extent spans logical extents that are accessible to the child clone. The inherited logical extent comprises an LBA for data in a data region of an ancestor of the child clone and a corresponding identifier (ID) of the ancestor. There may be one or multiple local logical extents and one or multiple inherited logical extents for each clone.

Data for an LBA in a read request (e.g., a read request LBA) may be rapidly found in either the child clone (using one of the local logical extents) or any of the ancestors (using one of the inherited logical extents). If the read request LBA is found in the local logical extent, the data may be read from the child clone (using the PSA within the local logical extent), requiring only the single LBA search. Otherwise, if the read request LBA is found in the inherited, logical extent, the next LBA search may be made directly in the local logical extent of the proper ancestor (e.g., ancestor clone or base object) that is identified by the ID of the ancestor associated with the proper LBA. That second search returns the PSA of the data in the data region of the ancestor. Thus, at most two LBA search I/Os are needed to locate the PSA of the data, even for clone trees with large numbers of clones. Reducing the search I/Os in this manner significantly reduces usage and improves management of computing resources, including processing, memory, and bandwidth, thereby improving the functioning of the underlying computing devices. Significant time savings is also achieved compared to searching each clone in the clone tree.

Aspects of the disclosure improve the technical performance (e.g., improve speed) of computing operations using linked clones at least by determining whether a read request LBA matches (corresponds to) an LBA in a local logical extent of a child clone or instead matches (corresponds to) an LBA in an inherited logical extent, and either returning the requested data from a data region of the child clone or returning the requested data from a data region of the identified ancestor. This realization of the performance improvement is enabled at least by generating a single logical map for the child clone, as described above and also in relation of FIGS. 3A-3E, 6, and 7. The operations determine the physical location of the data of a read request by examining up the logical map. If no extent is found, there is a gap. If the found extent is an inherited extent, the data is located in an ancestor clone. If the found extent is a local extent, the data can be retrieved from the local clone.

By recursively generating the inherited logical extent for each new child clone, the inherited logical extent automatically brings in the history of the parent (e.g., the immediate ancestor), which includes the history of its parent, which includes the history of its parent, etc. all the way back to the base object. Only a single copy source (the immediate parent) is needed for each generation, in order to maintain and grow the complete reference in the inherited logical extent of the most recent clone. This caps or limits the number of LBA search I/Os to two for any read request in which the LBA appears anywhere within the clone tree, no matter how large the clone tree may be. The technical performance improvement is thus accomplished at least by reducing the number of I/Os required for retrieving data from a clone—thereby reducing read latency and improving the functioning of the underlying device.

FIG. 1 illustrates an architecture 100 that may advantageously improve linked clone read performance by reducing read latency. In some examples, architecture 100 includes a computing platform 102 which may be implemented on one or more computing apparatus 818 of FIG. 8, and/or using a virtualization architecture 200 illustrated in FIG. 2. A clone tree 300 is generated by a clone manager 104 from a base object 310, and includes linked clones 320-340, and is illustrated in greater detail in FIGS. 3A-3E. With the set of three linked clones 320-340 illustrated, clone 340 will be identified as child clone 340, clone 330 will be identified as parent clone 330 because clone 330 is a parent to clone 340, and clone 320 will be identified as grandparent clone 320 because clone 320 is a parent to clone 330 (and thus is grandparent to clone 340). The terms parent and child are relative, for example, clone 330 is a child of clone 320. Together, base object 310 and clones 320 and 330 form a set of ancestors 302 for clone 340. As indicated, clone tree 300 receives an incoming read request 402 (e.g., an incoming read I/O), which is described in further detail in relation to FIGS. 4A-4C. Note that the description of FIG. 5 below uses terminology based on a reversed perspective of a clone tree.

Each of base object 310 and linked clones 320-340 has its own set of snapshots. For example, base object 310 has snapshot 1311 and snapshot 1312; clone 320 has snapshot 1321 and snapshot 1322; clone 330 has snapshot 1331 and snapshot 1332; and clone 340 has snapshot 1341 and snapshot 1342. Although only three clones with two snapshots each are illustrated, it should be understood that a different number of clones (e.g., thousands) and a different number of snapshots for each may be used. Aspects of the disclosure illustrate improved linked clone read performance for read request 402, as illustrated in FIGS. 4A-4C, which is enabled by the generation of clone tree 300 according to the scheme illustrated in FIGS. 3A-3E.

Figure 2:
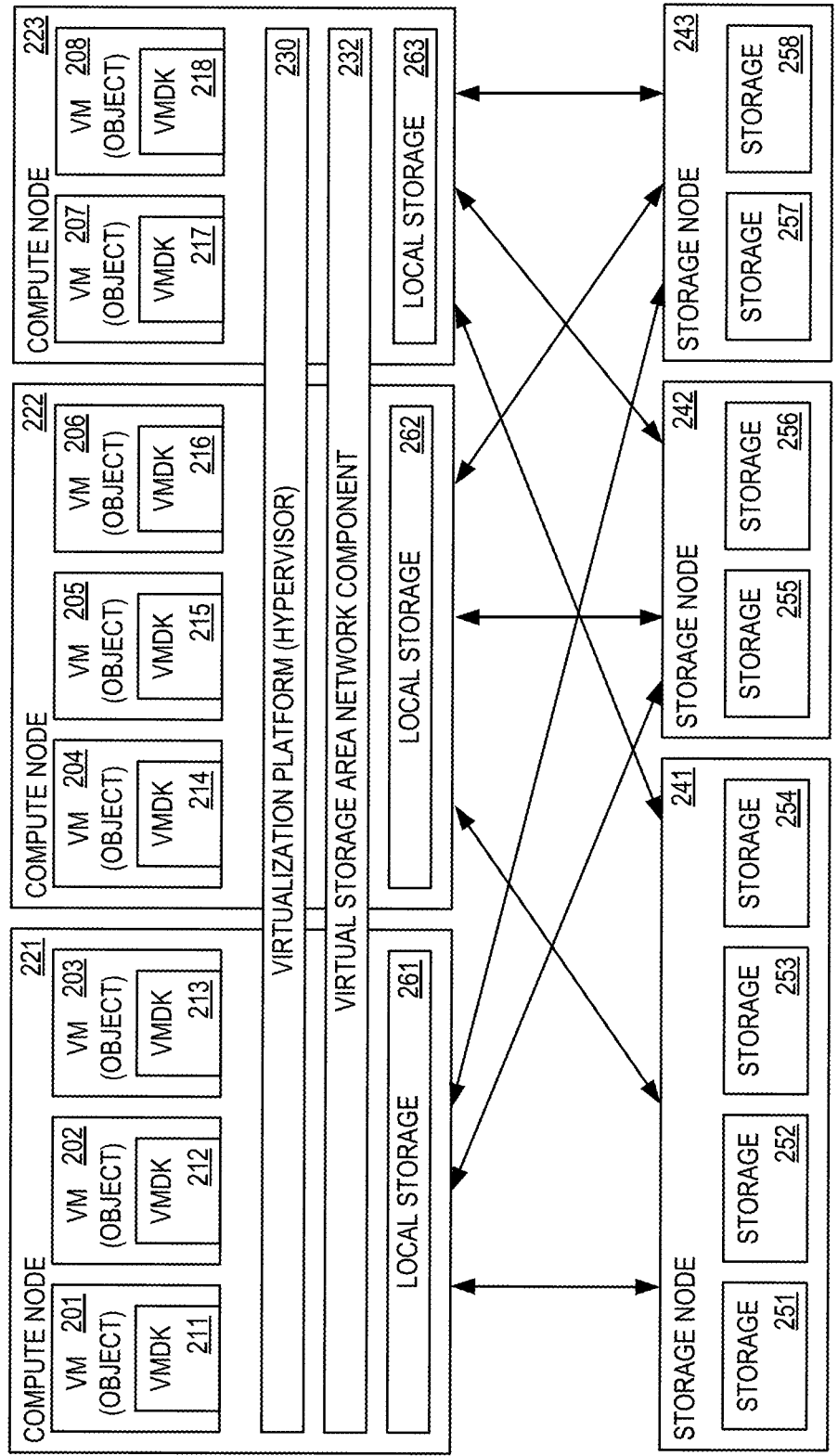
FIG. 2 illustrates further detail for some examples of the architecture of FIG. 1.

Examples of architecture 100 are operable with virtualized and non-virtualized storage solutions. FIG. 2 illustrates a virtualization architecture 200 that may be used as a version of platform 102. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage. When objects are created, they may be designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 may be local objects. In some examples, a single compute node may host 50, 100, or a different number of objects. Each object uses a VM disk (VMDK), for example VMDKs 211-218 for each of objects 201-208, respectively. Other implementations using different formats are also possible. A virtualization platform 230, which includes hypervisor functionality at one or more of computer nodes 221, 222, and 223, manages objects 201-208. In some examples, various components of virtualization architecture 200, for example compute nodes 221, 222, and 223, and storage nodes 241, 242, and 243 are implemented using one or more computing apparatus such as computing apparatus 818 of FIG. 8.

Virtualization software that provides software-defined storage (SDS), by pooling storage nodes across a cluster, creates a distributed, shared data store, for example a storage area network (SAN). Thus, objects 201-208 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 253, and 254; storage node 242 has storage 255 and 256; and storage node 243 has storage 257 and 258. In some examples, a single storage node may include a different number of physical storage components.

In the described examples, storage nodes 241-243 are treated as a SAN with a single global object, enabling any of objects 201-208 to write to and read from any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

Figure 3A:
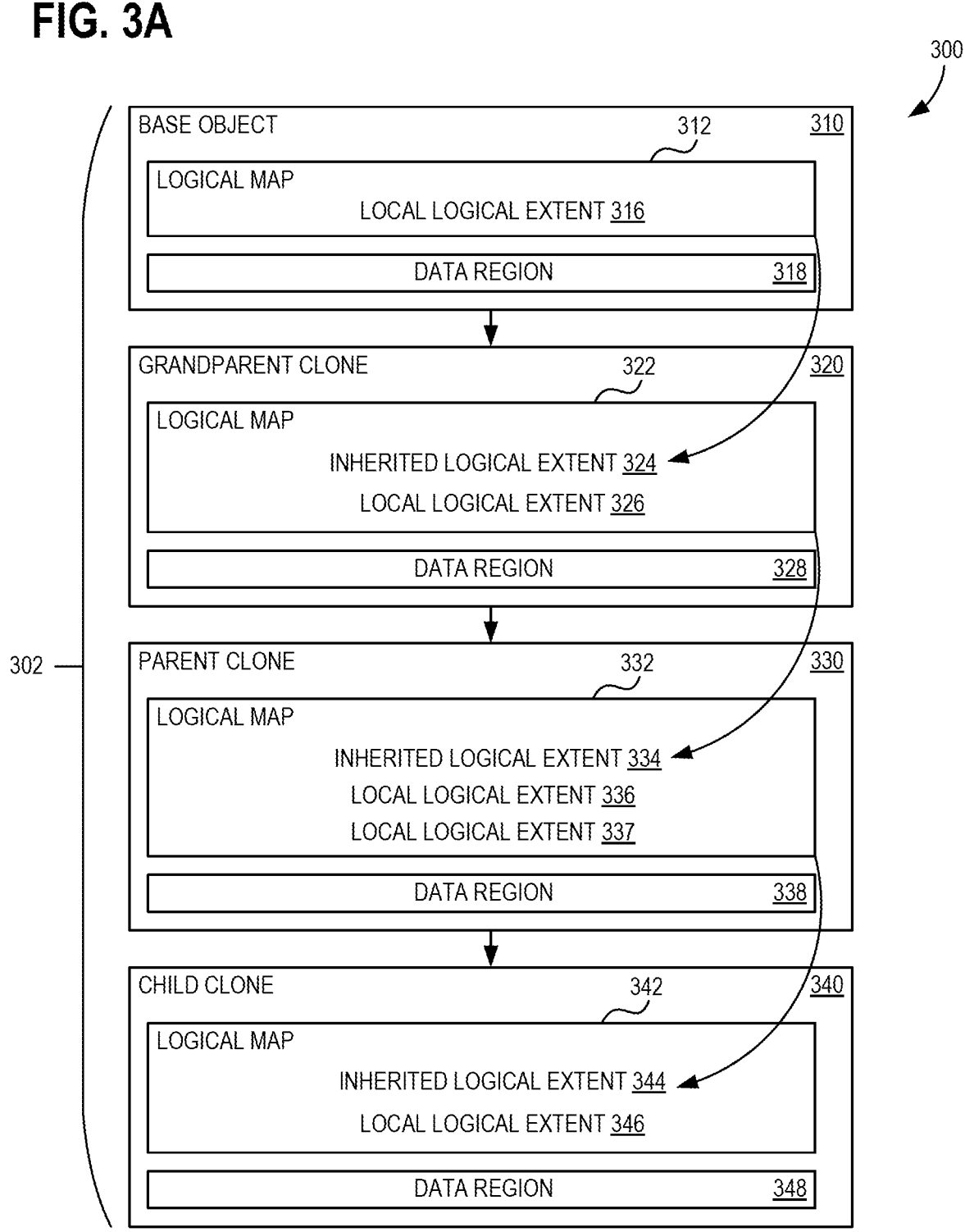
FIGS. 3A-3E illustrate recursive creation of logical maps for logical block addresses (LBAs) for data held in a clone tree, as may occur with the architecture of FIG. 1.

FIGS. 3A-3E illustrates recursive creation of logical maps for LBAs for data held in clone tree 300, as may occur with architecture 100. Referring to FIG. 3A, a clone tree spans from a base object 310 to a child clone 340, although it should be understood that a clone tree may have a different number of clones, such as thousands of clones. A clone 320 is identified as a grandparent clone because it is a grandparent to child clone 340. A clone 330 is identified as a parent clone because it is a parent to child clone 340. A child clone may be forked from a read-only snapshot of another clone, which then becomes a parent clone (in relation to the most recent child clone)—although that parent clone may be a child clone in relation to another clone earlier in the clone tree. The logical extents that are accessible to the snapshot, from which the child clone is forked, are copied when the child clone is created (e.g., generated). The inherited (e.g., copied) logical extents from the source snapshot are held in the same, single logical map of the child clone as the extents locally stored with the child clone. Although each clone may have multiple local logical extents and multiple inherited logical extents, for clarity of FIGS. 3A-3E, only clone 330 is shown with more than one local logical extent.

Whereas the local logical extent (e.g., covering the extents locally stored with the child clone) maintains the direct physical location of the data (e.g., in a PSA), the inherited logical extent instead holds indirect location information, such as an ID of the ancestor clone and the source snapshot, or a virtual ID that remains consistent (and does not change when the physical location of the data changes). Using indirect location information provides flexibility to move payload data dynamically to recycle storage, which may occur in certain file systems such as write-efficient log-structure file systems.

Figure 5:
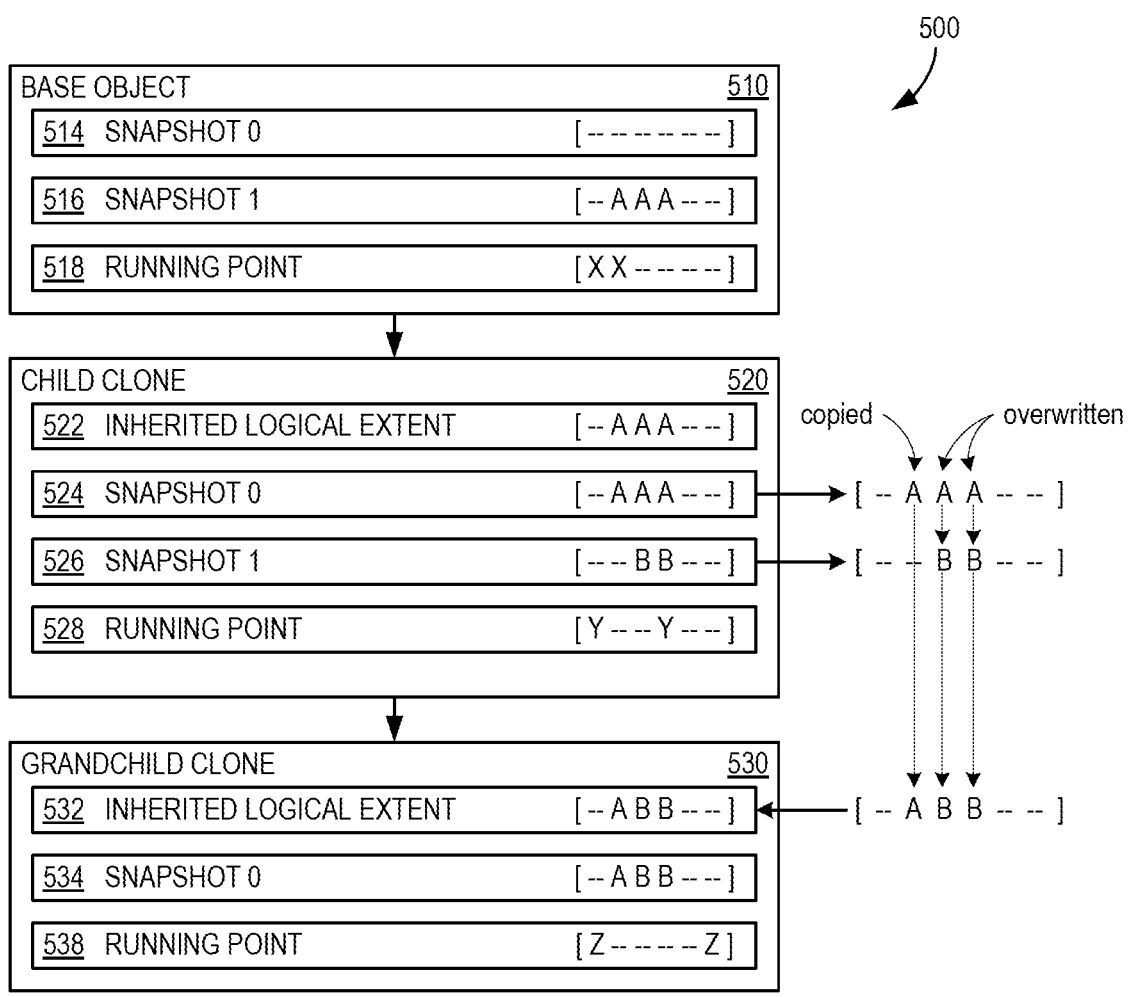
FIG. 5 illustrates a simplified example of improved linked clone read performance using an example of the architecture of FIG. 1.

In some examples, the local logical extent and the inherited logical extent use the same basic key-value schema, although with some differing fields. In some examples, the key is [LBA, snapshot ID] for both the local logical extent and the inherited logical extent. The LBA is the major key, and the snapshot ID is the minor key. For the local logical extent, the value may be [PSA, number of blocks, integrity value, compression flag, etc.] In some examples, the integrity value is a checksum, such as a cyclic redundancy check (CRC). However, for the inherited logical extent, the value may be [ID of the ancestor (AncestorID), snapshot ID of the source snapshot from which the child clone was forked]. In some examples, the AncestorID comprises a universally unique identifier (UUID). The inherited logical extent is copied when the child clone is created. Because the child clone may not have a snapshot at the time, a default value (e.g., 0) may be assigned to the inherited logical extent as the snapshot ID minor key. An inherited logical extent may be propagated from one clone to its child, and then to that child's child until overwritten. This is illustrated in FIG. 5, where an inherited logical extent is propagated to a grand-child clone.

In FIG. 3A, base object 310 has a logical map 312 and a data region 318. Logical map 312 has a local logical extent 316 and is illustrated in further detail in FIG. 3B. Grandparent clone 320, which is cloned from base object 310, has its own logical map 322 and a data region 328. Logical map 322 has an inherited logical extent 324 and a local logical extent 326, and is illustrated in further detail in FIG. 3C. Inherited logical extent 324 of grandparent clone 320 is derived from logical map 312 of base object 310. The extents accessible to the snapshot of base object 310, from which grandparent clone 320 is forked, are copied into inherited logical extent 324 for grandparent clone 320.

Parent clone 330, which is cloned from grandparent clone 320, has its own logical map 332 and a data region 338. Logical map 332 has an inherited logical extent 334 and a local logical extent 336, and is illustrated in further detail in FIG. 3D. Inherited logical extent 334 of parent clone 330 is derived from logical map 322 of grandparent clone 320. The extents accessible to the snapshot of grandparent clone 320, from which parent clone 330 is forked, are copied into inherited logical extent 334 for parent clone 330. Child clone 340, which is cloned from parent clone 330, has its own logical map 342 and a data region 348. Logical map 342 has an inherited logical extent 344 and a local logical extent 346, and is illustrated in further detail in FIG. 3E. Inherited logical extent 344 of child clone 340 is derived from logical map 332 of parent clone 330. The extents accessible to the snapshot of parent clone 330, from which child clone 340 is forked, are copied into inherited logical extent 344 for child clone 340.

Figure 3B:
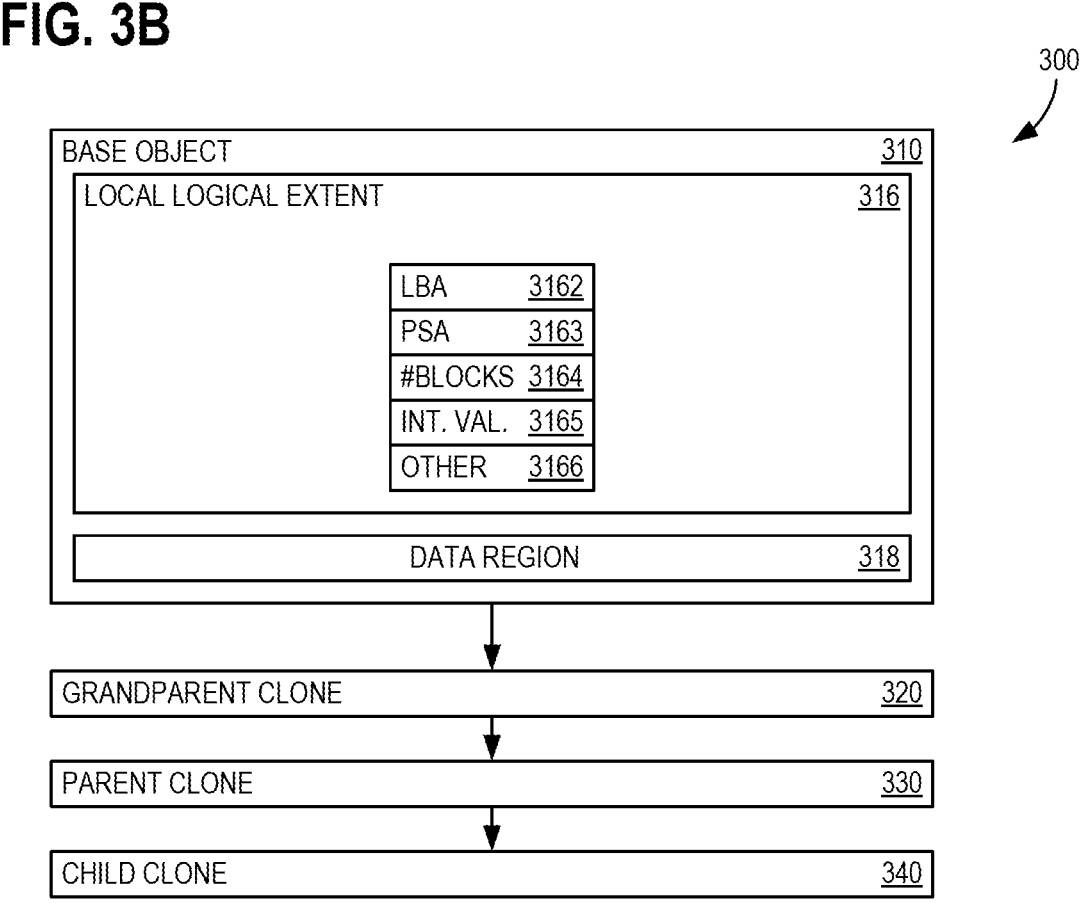
Figure 4B:
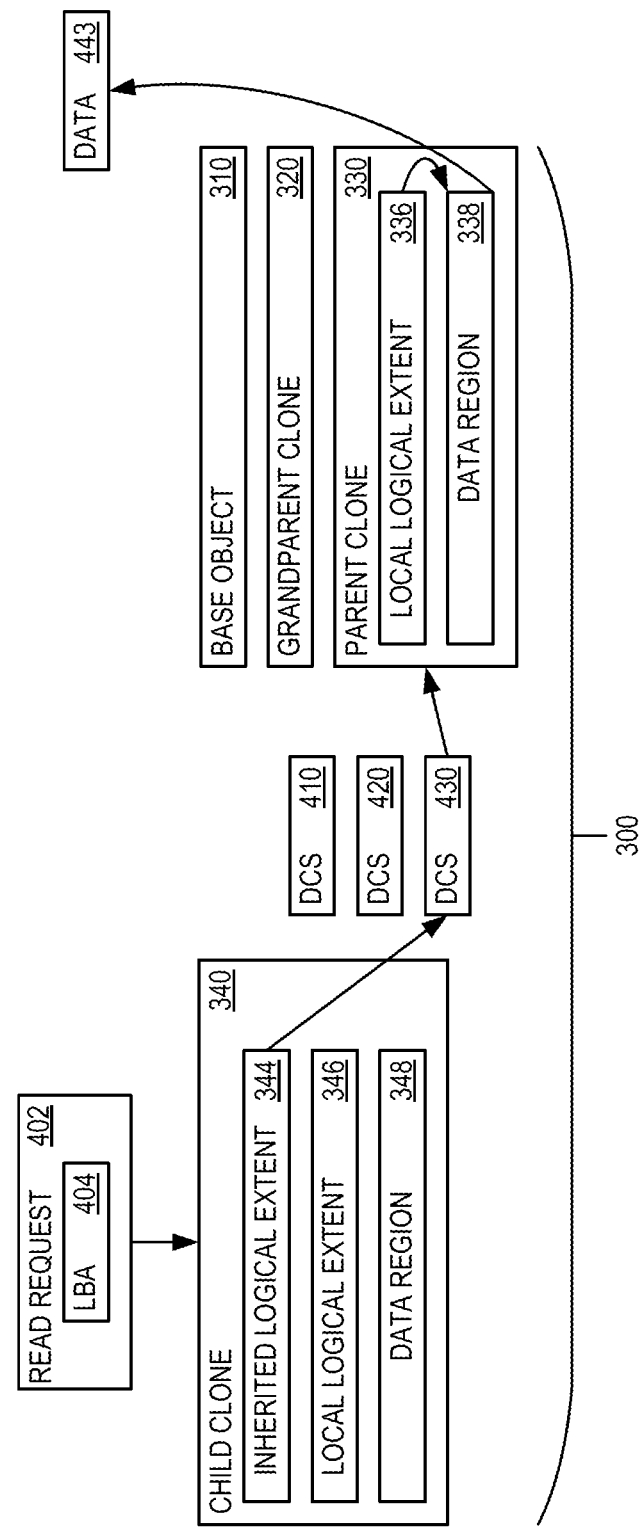
Figure 4C:
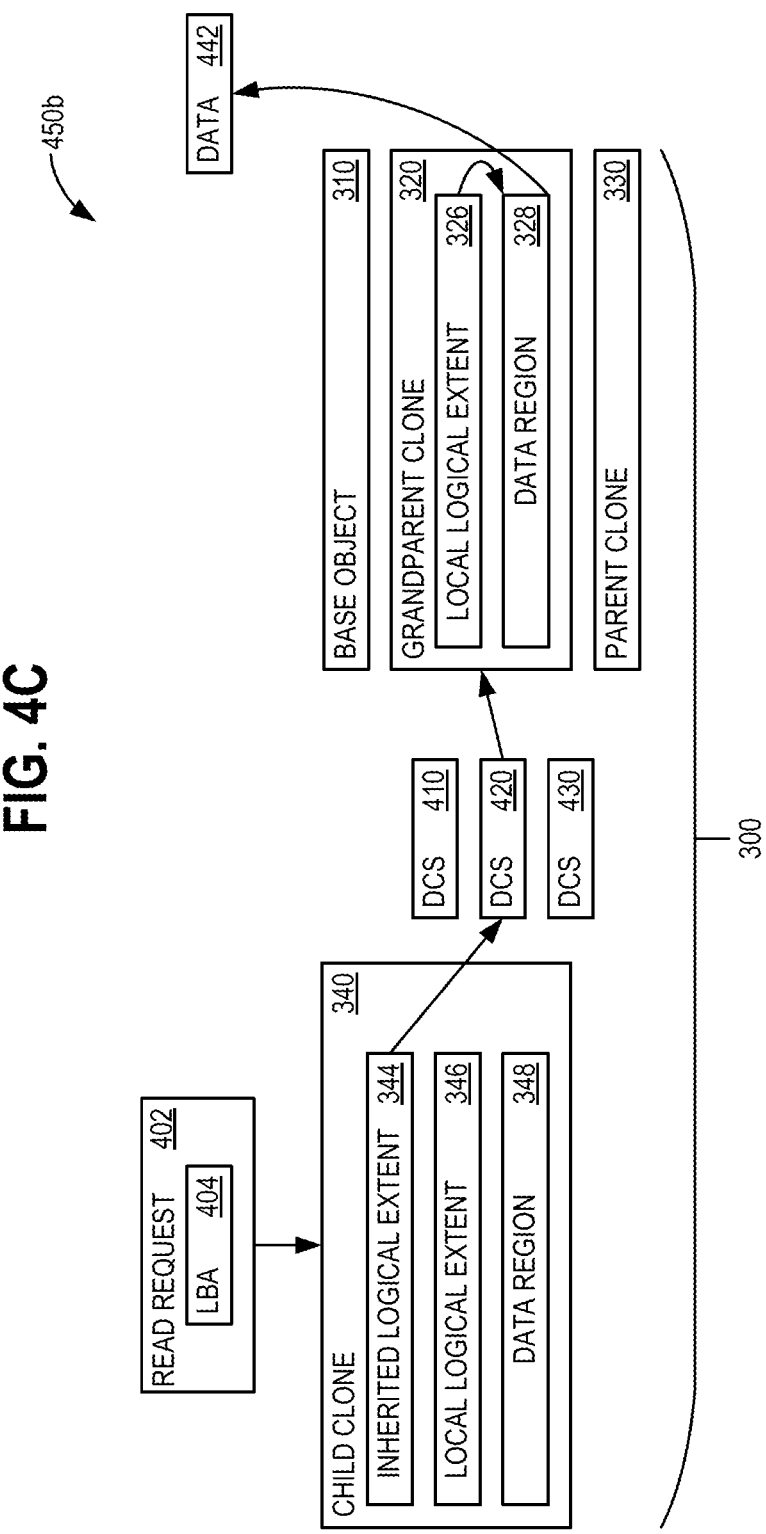

Referring now to FIG. 3B, further detail for base object 310 and local logical extent 316 is provided. Local logical extent 316 holds LBAs for data within data region 318, and is equal to a key-value pair. Other key-value pairs may be used in additional logical extents that are not shown. In some examples, the keys comprise snapshot IDs of a snapshot, because a single clone may have multiple snapshots and the single logical map covers metadata information of the extents of all snapshots. That is, a clone may be forked from a snapshot (as read-only), so a parent clone at least has two snapshots internally, if it has a child clone. One snapshot is a read-only snapshot for the child clone, and the other(s) being writable snapshots for the running point of the parent clone.

In the illustrated example, local logical extent 316 has a key comprising a snapshot ID and an LBA 3162 that is mapped to a PSA 3163 with an identified length as a number of blocks 3164 (due to space constraints, for clarity of the illustration, the snapshot IDs are not shown). An integrity value 3165, such as a checksum or a CRC, may be used for error detection, and an other field 3166 may hold other data, such as a compression flag. One logical extent can only have one key-value pair. As such, because one logical extent is shown, a single key-value pair is illustrated. It should be understood that other key-value pairs may be used in additional logical extents that are not shown.

Figure 3C:
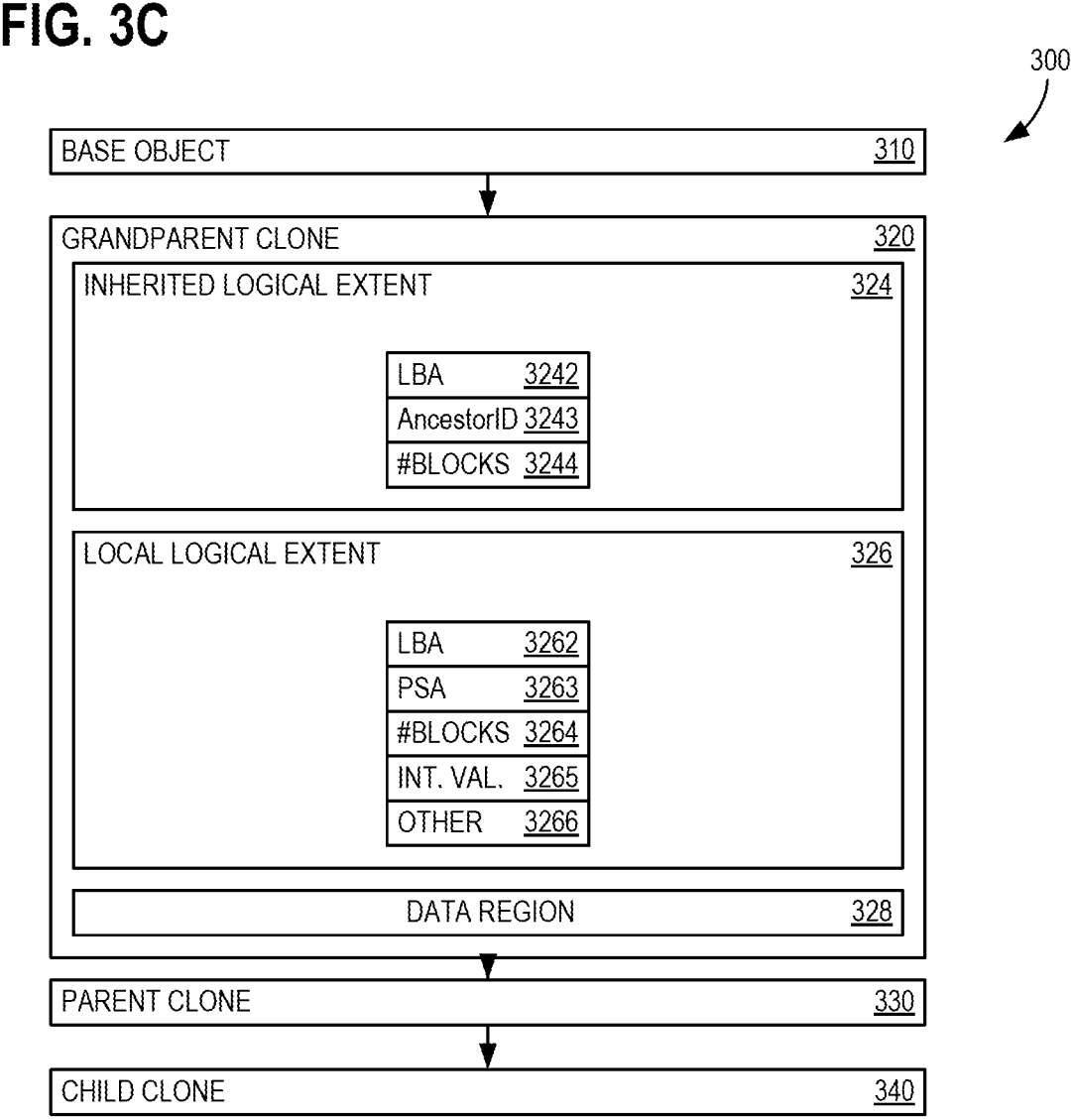

Referring now to FIG. 3C, further detail for grandparent clone 320, inherited logical extent 324, and local logical extent 326 is provided. Local logical extent 326 holds LBAs for data within data region 328, and is equal to a key-value pair. Other key-value pairs may be used in additional logical extents that are not shown. Local logical extent 326 has a key comprising a snapshot ID and an LBA 3262 that is mapped to a value having a PSA 3263 with an identified length as number of blocks 3264 (due to space constraints, for clarity of the illustration, the snapshot IDs are not shown). An integrity value 3265 may be used for error detection, and an other field 3266 may hold other data.

Inherited logical extent 324 is equal to a key-value pair, and is derived from logical map 312 of base object 310. Inherited logical extent 324 has a key with an LBA 3242 and also has an AncestorID 3243 identifying base object 310 (which may be 0000 for a base object), and an identified length as number of blocks 3244. In some examples, AncestorID 3243 comprises a UUID of base object 310.

Figure 3D:
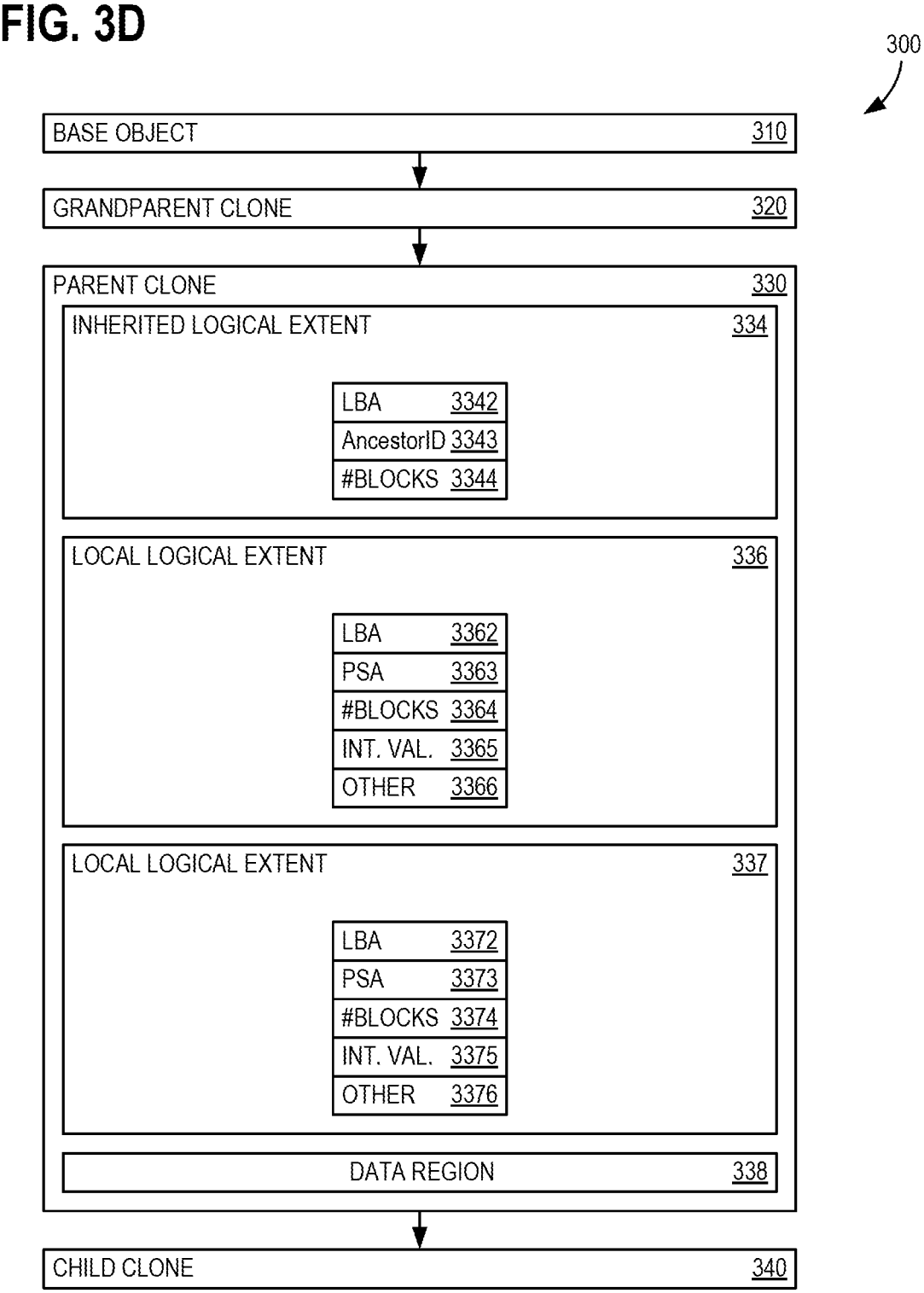

Referring now to FIG. 3D, further detail for parent clone 330, inherited logical extent 334, and local logical extent 336 is provided. Local logical extent 336 holds LBAs for data within data region 338, and is equal to key-value pairs in each of local logical extents 336 and 337, respectively. Local logical extent 336 has a key comprising a snapshot ID and an LBA 3362 that is mapped to a value having a PSA 3363 with an identified length as number of blocks 3364 (due to space constraints, for clarity of the illustration, the snapshot IDs are not shown). An integrity value 3365 may be used for error detection, and an other field 3366 may hold other data. Local logical extent 337 has a key comprising a snapshot ID and an LBA 3372 that is mapped to a value having a PSA 3373 with an identified length as number of blocks 3374, an integrity value 3375, and an other field 3376.

Inherited logical extent 334 is equal to a key-value pair, and is derived from logical map 322 of grandparent clone 320. Inherited logical extent 334 has a key with an LBA 3342 and also has an AncestorID 3343 identifying grandparent clone 320, and an identified length as number of blocks 3344. In some examples, AncestorID 3343 comprises a UUID of grandparent clone 320. Some extents may have been overwritten by grandparent clone 320 by the time parent clone 330 was generated. This is explained in further detail in relation to FIG. 5.

Figure 3E:
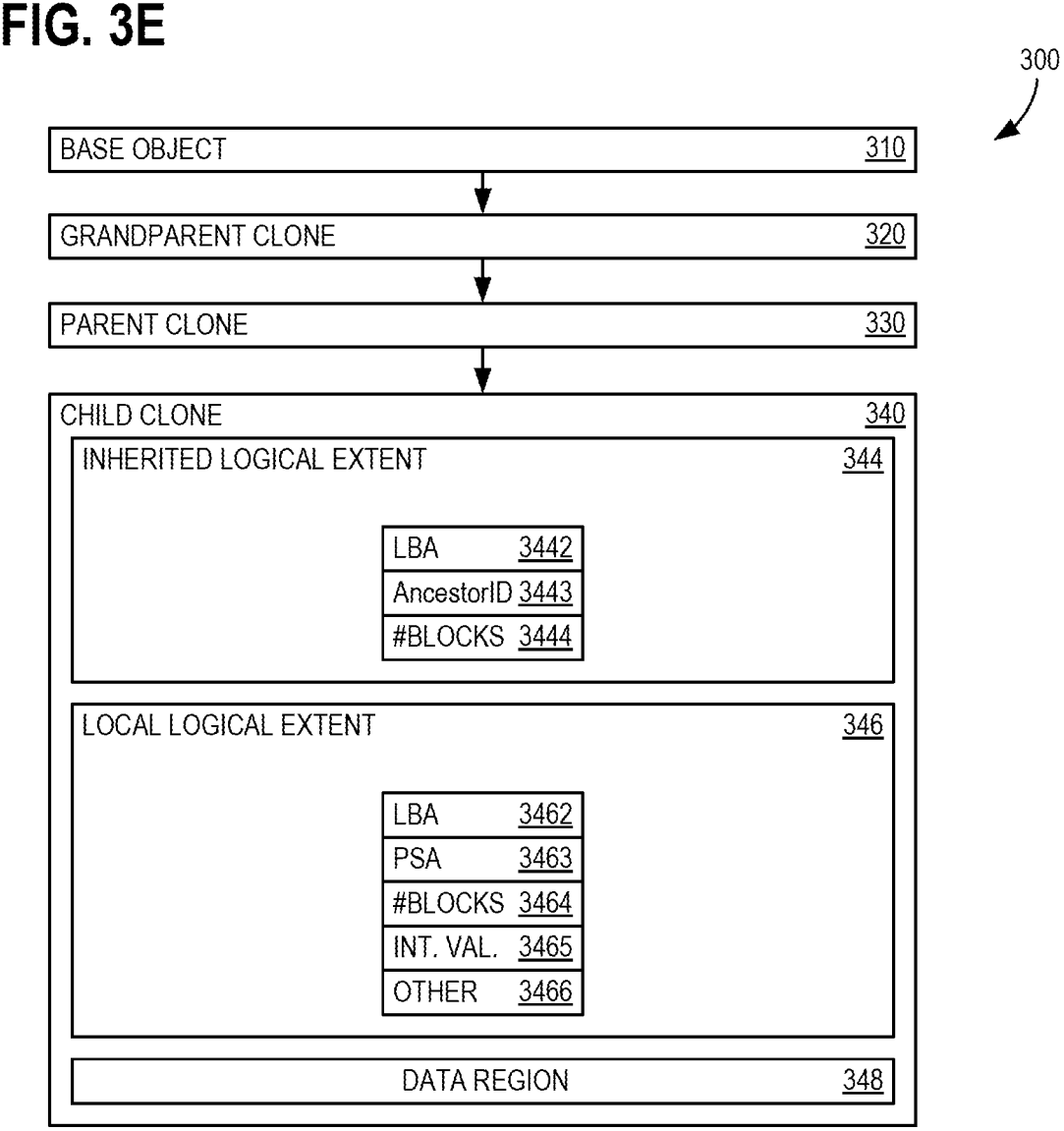

Referring now to FIG. 3E, further detail for child clone 340, inherited logical extent 344, and local logical extent 346 is provided. Local logical extent 346 holds LBAs for data within data region 348, and is equal to a key-value pair. Local logical extent 346 has a key comprising a snapshot ID and an LBA 3462 that is mapped to a value having a PSA 3463 with an identified length as number of blocks 3464 (due to space constraints, for clarity of the illustration, the snapshot IDs are not shown). An integrity value 3465 may be used for error detection, and an other field 3466 may hold other data.

Inherited logical extent 344 is equal to a key-value pair, and is derived from logical map 332 of parent clone 330. Inherited logical extent 344 has a key with an LBA 3442 and also has an AncestorID 3443 identifying parent clone 330, and an identified length as number of blocks 3444. In some examples, AncestorID 3443 comprises a UUID of parent clone 330. Some extents may have been overwritten by parent clone 330 by the time child clone 340 was generated.

FIGS. 4A-4C illustrate reading data from clone tree 300, specifically reading data that is local to child clone 340 (FIG. 4A), local to parent clone 330 (FIG. 4A), and local to grandparent clone 320 (FIG. 4C). In a scenario 400, shown in FIG. 4A child clone 340 receives read request 402, which has a read request LBA 404. That is, read request 402 seeks data located at read request LBA 404. For scenario 400, read request LBA 404 may match (e.g., correspond to) LBA 3462, which is located within local logical extent 346. Because read request LBA 404 is found within local logical extent 346, the data at read request LBA 404 is read from data region 348 (e.g., using PSA 3463) and returned as data 444 from data region 348 of child clone 340. FIG. 4A further illustrates a distributed object manager (DOM) client session (DCS) linking child clone 340 to each of base object 310 (e.g., linked by a DCS 410), grandparent clone 320 (linked by a DCS 420), and parent clone 330 (e.g., linked by a DCS 430). However, because data 444 was local to child clone 340, none of DCSs 410-430 is needed in order to retrieve data 444.

FIG. 4B illustrates advantageous use of inherited logical extent 344 for improving linked clone read performance. In a scenario 450a, child clone 340 receives read request 402, which has read request LBA 404. For scenario 450a, read request LBA 404 may correspond to (e.g., match) LBA 3362. Local logical extent 346 is searched for read request LBA 404, but no matching LBA is found within local logical extent 346. Inherited logical extent 344 is searched for read request LBA 404. Because LBA 3442 spans the extent of parent clone 330, and is located within inherited logical extent 344, AncestorID 3443 is identified that indicates parent clone 330. This enables DCS 430 to forward read request 402 to parent clone 330. Within parent clone 330, local logical extent 336 identifies read request LBA 404 as corresponding to LBA 3362 at PSA 3363. The data at read request LBA 404 is read from data region 338 and returned as data 443 from data region 338 of parent clone 330.

FIG. 4C also illustrates advantageous use of inherited logical extent 344 for improving linked clone read performance in another scenario. In a scenario 450b, child clone 340 receives read request 402, which has read request LBA 404. For scenario 450b, read request LBA 404 may correspond to LBA 3262. Local logical extent 346 is searched for read request LBA 404, but no matching LBA is found within local logical extent 346. Inherited logical extent 344 is searched for read request LBA 404. Because the identified LBA 3342 spans the extent of grandparent clone 320, and is located within an inherited logical extent, an AncestorID is identified that indicates grandparent clone 320. This enables DCS 420 to forward read request 402 to grandparent clone 320. Within grandparent clone 320, local logical extent 326 identifies read request LBA 404 as corresponding to LBA 3262 at PSA 3263. The data at read request LBA 404 is read from data region 328 and returned as data 442 from data region 328 of grandparent clone 320.

FIG. 5 illustrates a simplified example of using an example of architecture 100 for improved linked clone read performance. FIG. 5 demonstrates the use of the term "child clone" from the perspective of a base object 510 and working forward in time as a clone tree 500 grows. A child clone 520 is generated (e.g., created, forked) from base object 510, and a grandchild clone 530 is generated from child clone 520. Using the perspective of FIGS. 3A-4C, working backward in time for clone tree 300, grandchild clone 530 would be termed a "child clone," child clone 520 would be termed a "parent clone," and base object 510 would be termed a "grandparent." Either perspective may be used for determining terminology when describing ancestors and/or descendants.

The example illustrated in FIG. 5 uses a terse notional address space of six (6) blocks in which "-" indicates an empty block and "A/B/X/Y/Z" indicates that a block is written at a particular snapshot. Base object 510 has a snapshot 514 indicated as "snapshot 0" because it is the first snapshot with 0-based indexing, and the extent is shown as empty, with [- - - - - -]. Base object 510 also has a snapshot 516 indicated as "snapshot 1" with three blocks written, [-A A A - -], and a running point 518 with [X X - - - -]. Child clone 520 is forked from snapshot 516 ("snapshot 1") of base object 510, and so has inherited logical extent 522 with [- A A A - -]. This is also shown for snapshot 524 (indicated as "snapshot 0") for child clone 520. A subsequent snapshot 526 of child clone 520 (indicated as "snapshot 1") has two blocks written, [- - B B - -], and a running point 528 with [Y - - Y - -].

Grandchild clone 530 is forked from snapshot 526 ("snapshot 1") of child clone 520, and so has inherited logical extent 532 with [- A B B - -]. The second block remains an A, copied from base object 510, although the third and fourth blocks are overwritten as B's by child clone 520. Inherited logical extent 532 is also shown for snapshot 534 (indicated as "snapshot 0") for grandchild clone 530. At a later time, grandchild clone 530 has a running point 538 with [Z - - - - Z].

During a read operation, when a client requests to read block 0 (the first block in 0-based indexing) at grandchild clone 530 (e.g., running point), because block 0 is locally written ("Z"), the payload data is retrieved locally, directly from grandchild clone 530. However, when the client requests to read block 1 (the second block in 0-based indexing), because block 1 is remotely written ("A") at base object 510, the read request is forwarded to base object 510 to retrieve the payload data.

Figure 6:
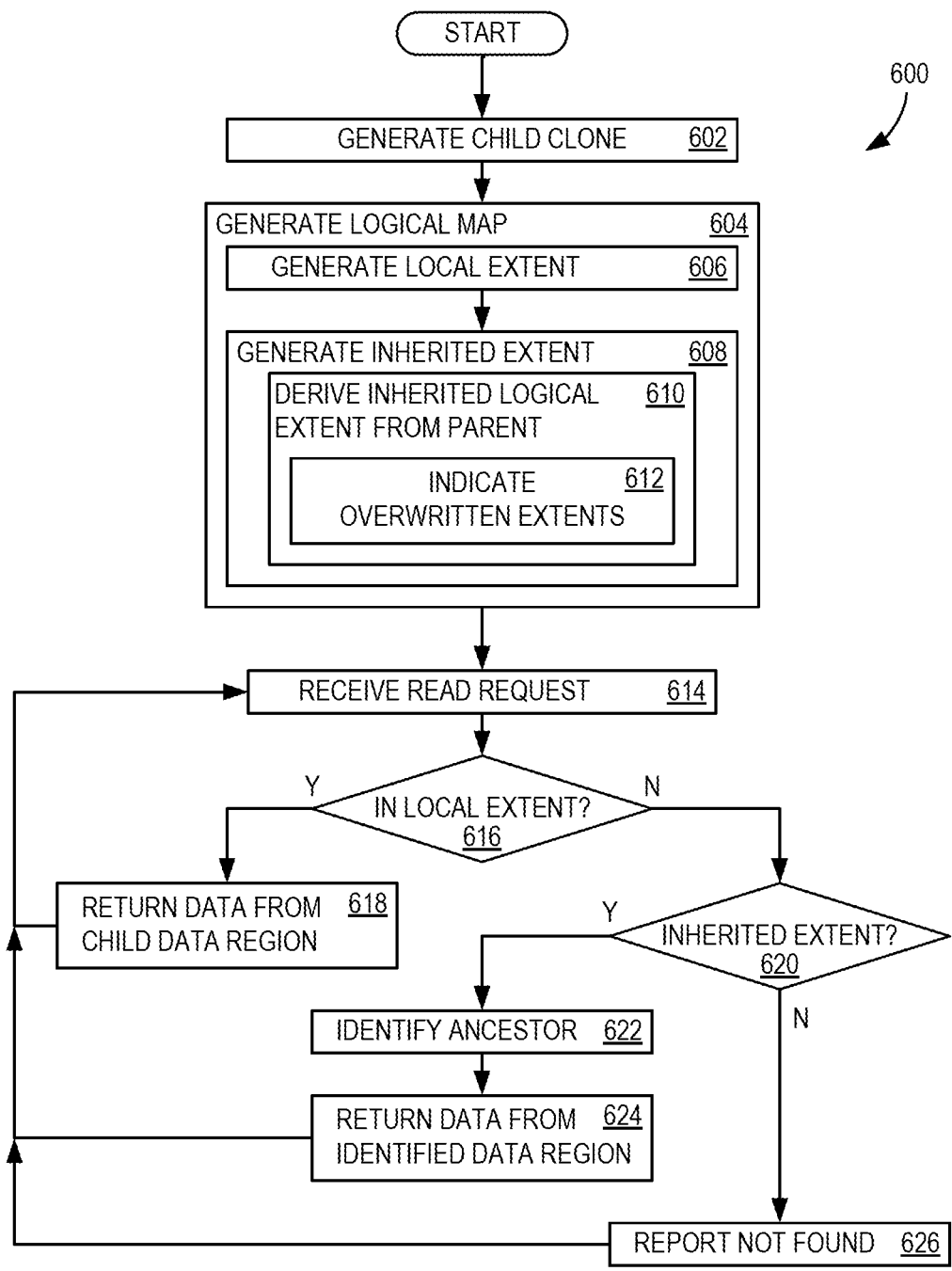
FIG. 6 illustrates a flowchart of exemplary operations associated with examples of the architecture of FIG. 1.

FIG. 6 illustrates a flowchart 600 of exemplary operations associated with improving linked clone read performance. In some examples, the operations of flowchart 600 are performed by one or more computing apparatus 818 of FIG. 8. Flowchart 600 commences with operation 602, which includes generating child clone 340 and creating data region 348 in child clone 340. In some examples, operation 602 further incudes generating a virtual storage area network object (vSAN) object for child clone 340. In some examples, child clone 340 comprises a linked clone.

Operation 604, which may be performed with operations 606-612, includes generating logical map 342 for child clone 340, logical map 342 for child clone 340 comprising local logical extent 346 and inherited logical extent 344. In some examples, logical map 342 for child clone 340 comprises a B+ tree. In some examples, logical map 342 for child clone 340 comprises a key-value pair.

Operation 606 includes generating local logical extent 346 comprising an LBA for data in data region 348 of child clone 340 and a PSA corresponding to the LBA for the data in data region 348 of child clone 340. In some examples, local logical extent 346 further comprises a snapshot ID of child clone 340. In some examples, logical map 342 for child clone 340 further comprises a count of blocks corresponding to the LBA for the data in data region 348 of child clone 340. In some examples, logical map 342 for child clone 340 further comprises an integrity value for the data in data region 348 of child clone 340. In some examples, the integrity value comprises a checksum (e.g., a CRC). In some examples, the key of the key-value pair comprises the LBA for the data in data region 348 of child clone 340.

Operation 608, which may be performed with operations 610-612, includes generating inherited logical extent 344 spanning logical extents that are accessible to child clone 340, inherited logical extent 344 comprising an LBA for data in a data region of a first ancestor of child clone 340 and a corresponding ID of the first ancestor. In some examples, inherited logical extent 344 further comprises a snapshot ID of the first ancestor (e.g., any of base object 310, grandparent clone 320, and parent clone 330). In some examples, the ID of the first ancestor comprises a UUID of the first ancestor. In some examples, inherited logical extent 344 further comprises a virtual ID indicating (e.g., pointing to) the first ancestor. In some examples, logical map 342 for child clone 340 further comprises a count of blocks corresponding to the LBA for the data in a data region (e.g., any of data regions 318, 328, and 338) of the first ancestor. In some examples, inherited logical extent 344 further comprises a snapshot ID of the first ancestor.

In some examples, inherited logical extent 344 further comprises an LBA for data in a data region of a second ancestor (e.g., any of base object 310, grandparent clone 320, and parent clone 330) of child clone 340 and a corresponding ID of the second ancestor. In some examples, the second ancestor is an ancestor of the first ancestor. In some examples, the key of the key-value pair comprises the LBA for the data in the data region of the ancestor. Inherited logical extent 344 is derived from logical map 332 of parent clone 330 in operation 610, although any extents of inherited logical extent 334 of parent clone 330 that are overwritten by parent clone 330 are indicated in the snapshot of parent clone 330 from which child clone 340 is forked (see operation 612).

Operation 614 includes receiving read request 402 having read request LBA 404, and decision operation 616 includes determining whether read request LBA 404 corresponds to an LBA in local logical extent 346. If the requested data is local to child clone 340, operation 618 includes, based on at least determining that read request LBA 404 corresponds to the LBA in local logical extent 346, returning the data from data region 348 of child clone 340. To accomplish this, operation 618 also includes identifying a PSA corresponding to the LBA for the data in data region 348 of child clone 340.

However, if the requested data is not local to child clone 340, operation 620 includes, based on at least determining that read request LBA 404 does not correspond to an LBA in local logical extent 346, determining whether read request LBA 404 corresponds to an LBA in inherited logical extent 344. If read request LBA 404 does correspond to an LBA in inherited logical extent 344, the specific ancestor is identified in operation 622, using the AncestorID that is mapped to the LBA in inherited logical extent 344. Operation 624 includes, based on at least determining that read request LBA 404 corresponds to the LBA in inherited logical extent 344, returning the data from the data region of the identified ancestor. To accomplish this, operation 624 also includes, based on at least determining that read request LBA 404 corresponds to the LBA in inherited logical extent 344, reading a logical map of the identified ancestor. This may involve identifying the PSA corresponding to the LBA for the data in the data region of the identified ancestor.

If no LBA can be found in either local logical extent 346 or inherited logical extent 344 that corresponds to read request LBA 404, operation 626 reports that read request LBA 404 is not found. After any of operations 618, 624, and 626, flowchart 600 returns to operation 614 to await the next read request.

Figure 7:
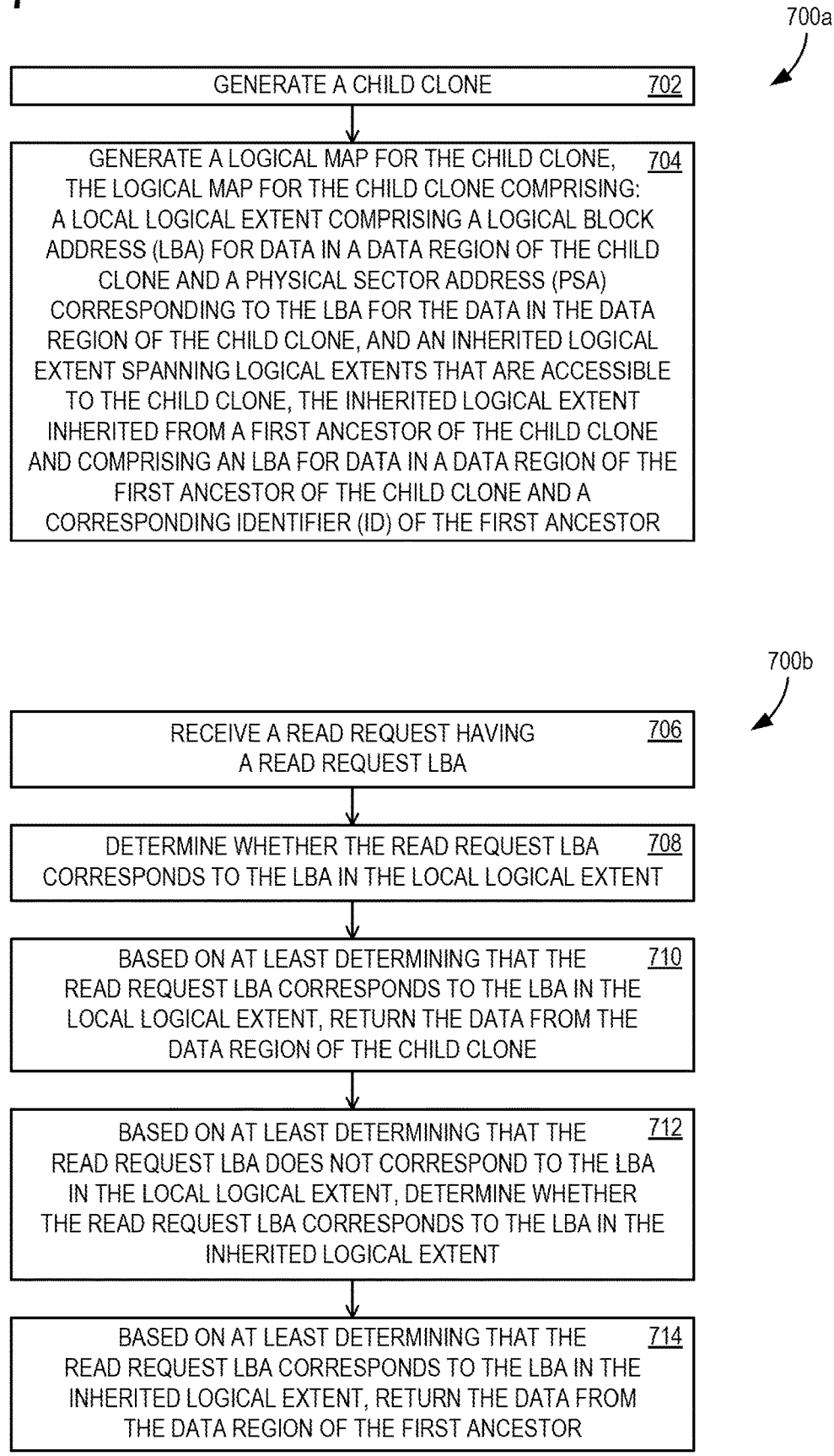
FIG. 7 illustrates exemplary operations associated with examples of the architecture of FIG. 1.

FIG. 7 illustrates flows 700a and 700b of exemplary operations associated with improving linked clone read performance. In some examples, the operations of flows 700a and 700b are performed by one or more computing apparatus 818 of FIG. 8. Flow 700a commences with operation 702, which includes generating a child clone. Operation 704 includes generating one logical map for the child clone, the logical map for the child clone comprising: a local logical extent comprising an LBA for data in a data region of the child clone and a PSA corresponding to the LBA for the data in the data region of the child clone, and an inherited logical extent spanning logical extents that are accessible to the child clone, the inherited logical extent inherited from a first ancestor of the child clone and comprising an LBA for data in a data region of the first ancestor of the child clone and a corresponding ID of the first ancestor.

Flow 700b commences with operation 706, which includes receiving a read request having a read request LBA. Operation 708 includes determining whether the read request LBA corresponds to the LBA in the local logical extent. Operation 710 includes, based on at least determining that the read request LBA corresponds to the LBA in the local logical extent, returning the data from the data region of the child clone. Operation 712 includes, based on at least determining that the read request LBA does not correspond to the LBA in the local logical extent, determining whether the read request LBA corresponds to the LBA in the inherited logical extent. Operation 714 includes, based on at least determining that the read request LBA corresponds to the LBA in the inherited logical extent, returning the data from the data region of the first ancestor.

Additional Examples

An example method comprises: generating a child clone; generating a logical map for the child clone, the logical map for the child clone comprising: a local logical extent comprising an LBA for data in a data region of the child clone and a PSA corresponding to the LBA for the data in the data region of the child clone, and an inherited logical extent spanning logical extents that are accessible to the child clone, the inherited logical extent inherited from a first ancestor of the child clone and comprising an LBA for data in a data region of the first ancestor of the child clone and a ID of the first ancestor; receiving a read request having a read request LBA; determining whether the read request LBA corresponds to the LBA in the local logical extent; based on at least determining that the read request LBA corresponds to the LBA in the local logical extent, returning the data from the data region of the child clone; based on at least determining that the read request LBA does not correspond to the LBA in the local logical extent, determining whether the read request LBA corresponds to the LBA in the inherited logical extent; and based on at least determining that the read request LBA corresponds to the LBA in the inherited logical extent, returning the data from the data region of the first ancestor.

An example computer system comprises: a processor; and a non-transitory computer readable medium having stored thereon program code executable by the processor, the program code causing the processor to: generate a child clone; generate a logical map for the child clone, the logical map for the child clone comprising: a local logical extent comprising an LBA for data in a data region of the child clone and a PSA corresponding to the LBA for the data in the data region of the child clone, and an inherited logical extent spanning logical extents that are accessible to the child clone, the inherited logical extent inherited from a first ancestor of the child clone and comprising an LBA for data in a data region of the first ancestor of the child clone and a corresponding ID of the first ancestor; receive a read request having a read request LBA; determine whether the read request LBA corresponds to the LBA in the local logical extent; based on at least determining that the read request LBA corresponds to the LBA in the local logical extent, return the data from the data region of the child clone; based on at least determining that the read request LBA does not correspond to the LBA in the local logical extent, determine whether the read request LBA corresponds to the LBA in the inherited logical extent; and based on at least determining that the read request LBA corresponds to the LBA in the inherited logical extent, return the data from the data region of the first ancestor.

An example non-transitory computer storage medium has stored thereon program code executable by a processor, the program code embodying a method comprising: generating a child clone; generating a logical map for the child clone, the logical map for the child clone comprising: a local logical extent comprising an LBA for data in a data region of the child clone and a PSA corresponding to the LBA for the data in the data region of the child clone, and an inherited logical extent spanning logical extents that are accessible to the child clone, the inherited logical extent inherited from a first ancestor of the child clone and comprising an LBA for data in a data region of the first ancestor of the child clone and a corresponding ID of the first ancestor; receiving a read request having a read request LBA; determining whether the read request LBA corresponds to the LBA in the local logical extent; based on at least determining that the read request LBA corresponds to the LBA in the local logical extent, returning the data from the data region of the child clone; based on at least determining that the read request LBA does not correspond to the LBA in the local logical extent, determining whether the read request LBA corresponds to the LBA in the inherited logical extent; and based on at least determining that the read request LBA corresponds to the LBA in the inherited logical extent, returning the data from the data region of the first ancestor.

Alternatively, or in addition to the other examples described herein, examples include any combination of the following:
  based on at least determining that the read request LBA corresponds to the LBA in the inherited logical extent, reading a logical map of the first ancestor;
  identifying a PSA corresponding to the LBA for the data in the data region of the first ancestor;
  the inherited logical extent further comprises an LBA for data in a data region of a second ancestor of the child clone and a corresponding ID of the second ancestor;
  the second ancestor is an ancestor of the first ancestor;
  the local logical extent further comprises a snapshot ID of the child clone;
  the inherited logical extent further comprises a snapshot ID of the first ancestor;
  the ID of the first ancestor comprises a UUID of the first ancestor;
  the logical map for the child clone comprises a B+ tree;
  the logical map for the child clone further comprises a count of blocks corresponding to the LBA for the data in a data region of the child clone;
  the logical map for the child clone further comprises a count of blocks corresponding to the LBA for the data in a data region of the first ancestor;
  the logical map for the child clone further comprises an integrity value for the data in the data region of the child clone;
  the integrity value comprises a checksum;
  the integrity value comprises a CRC;
  the logical map for the child clone comprises a key-value pair;
  the key of the key-value pair comprises the LBA for the data in the data region of the child clone;

the key of the key-value pair comprises the LBA for the data in the data region of the ancestor;

the inherited logical extent further comprises a virtual ID pointing to the first ancestor;

generating a vSAN object for the child clone; and the child clone comprises a linked clone.

Exemplary Operating Environment

Figure 8:
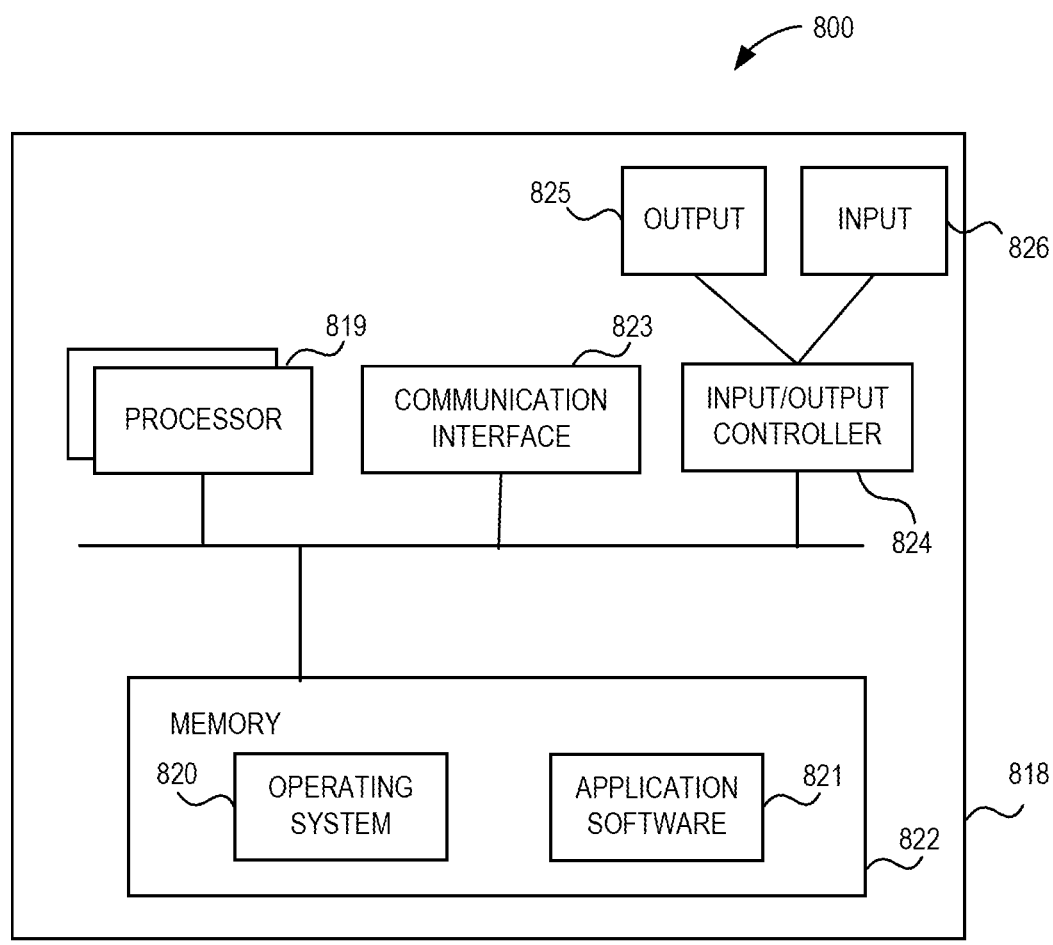
FIG. 8 illustrates a block diagram of a computing apparatus that may be used as a component of the architecture of FIG. 1, according to an example.

The present disclosure is operable with a computing device (computing apparatus) according to an embodiment shown as a functional block diagram 800 in FIG. 8. In an embodiment, components of a computing apparatus 818 may be implemented as part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the computing apparatus 818 to enable application software 821 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, DVDs, CDs, floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
    generating a child clone;
    generating a logical map for the child clone, the logical map for the child clone comprising:
        a local logical extent comprising a logical block address (LBA) for data in a data region of the child clone and a physical sector address (PSA) corresponding to the LBA for the data in the data region of the child clone, and
        an inherited logical extent spanning logical extents that are accessible to the child clone, the inherited logical extent inherited from a first ancestor of the child clone and comprising an LBA for data in a data region of the first ancestor and an ancestor identifier (ID) of the first ancestor;
    receiving a read request having a read request LBA;
    upon at least determining that the read request LBA corresponds to the LBA in the local logical extent, returning the data from the data region of the child clone; and
    upon at least determining that the read request LBA does not correspond to the LBA in the local logical extent, determining that the read request LBA corresponds to the LBA in the inherited logical extent, identifying the first ancestor directly using the ancestor ID that is mapped to the LBA in the inherited logical extent, and returning the data from the data region of the identified first ancestor.

2. The method of claim 1, wherein the read request LBA corresponds to the LBA in the inherited logical extent, and further comprising:
    reading a logical map of the first ancestor; and
    identifying a PSA corresponding to the LBA for the data in the data region of the first ancestor.

3. The method of claim 1, wherein the inherited logical extent further comprises an LBA for data in a data region of a second ancestor of the child clone and a corresponding ID of the second ancestor, and
    wherein the second ancestor is an ancestor of the first ancestor.

4. The method of claim 1, wherein the local logical extent further comprises a snapshot ID of the child clone.

5. The method of claim 1, wherein the inherited logical extent includes a history of all ancestors of the child clone.

6. The method of claim 1, wherein the ancestor ID of the first ancestor comprises a universally unique identifier (UUID) of the first ancestor.

7. The method of claim 1, further comprising after identifying the first ancestor, searching directly in a local logical extent of the identified first ancestor, the child clone being forked from the identified first ancestor and inheriting the local logical extent of the identified first ancestor as the inherited logical extent in the child clone.

8. A computer system comprising:
a processor; and
a non-transitory computer readable medium having stored thereon program code executable by the processor, the program code causing the processor to:
generate a child clone;
generate a logical map for the child clone, the logical map for the child clone comprising:
  a local logical extent comprising a logical block address (LBA) for data in a data region of the child clone and a physical sector address (PSA) corresponding to the LBA for the data in the data region of the child clone, and
  an inherited logical extent spanning logical extents that are accessible to the child clone, the inherited logical extent inherited from a first ancestor of the child clone and comprising an LBA for data in a data region of the first ancestor and an ancestor identifier (ID) of the first ancestor;
receive a read request having a read request LBA;
upon at least determining that r the read request LBA corresponds to the LBA in the local logical extent, return the data from the data region of the child clone; and
upon at least determining that the read request LBA does not correspond to the LBA in the local logical extent, determine that the read request LBA corresponds to the LBA in the inherited logical extent, identify the first ancestor directly using the ancestor ID that is mapped to the LBA in the inherited logical extent, and return the data from the data region of the identified first ancestor.

9. The computer system of claim 8, wherein the read request LBA corresponds to the LBA in the inherited logical extent, and wherein the program code is further operative to:
read a logical map of the first ancestor; and
identify a PSA corresponding to the LBA for the data in the data region of the first ancestor.

10. The computer system of claim 8, wherein the inherited logical extent further comprises an LBA for data in a data region of a second ancestor of the child clone and a corresponding ID of the second ancestor, and
wherein the second ancestor is an ancestor of the first ancestor.

11. The computer system of claim 8, wherein the local logical extent further comprises a snapshot ID of the child clone.

12. The computer system of claim 8, wherein the inherited logical extent includes a history of all ancestors of the child clone.

13. The computer system of claim 8, wherein the ancestor ID of the first ancestor comprises a universally unique identifier (UUID) of the first ancestor.

14. The computer system of claim 8, wherein the logical map for the child clone comprises a B+ tree.

15. A non-transitory computer storage medium having stored thereon program code executable by a processor, the program code embodying a method comprising:
generating a child clone;
generating a logical map for the child clone, the logical map for the child clone comprising:
  a local logical extent comprising a logical block address (LBA) for data in a data region of the child clone and a physical sector address (PSA) corresponding to the LBA for the data in the data region of the child clone, and
  an inherited logical extent spanning logical extents that are accessible to the child clone, the inherited logical extent inherited from a first ancestor of the child clone and comprising an LBA for data in a data region of the first ancestor and an ancestor identifier (ID) of the first ancestor;
receiving a read request having a read request LBA;
upon at least determining that the read request LBA corresponds to the LBA in the local logical extent, returning the data from the data region of the child clone; and
upon at least determining that the read request LBA does not correspond to the LBA in the local logical extent, determining that the read request LBA corresponds to the LBA in the inherited logical extent, identifying the first ancestor directly using the ancestor ID that is mapped to the LBA in the inherited logical extent, and returning the data from the data region of the identified first ancestor.

16. The computer storage medium of claim 15, wherein the read request LBA corresponds to the LBA in the inherited logical extent, and wherein the program code further comprises:
reading a logical map of the first ancestor; and
identifying a PSA corresponding to the LBA for the data in the data region of the first ancestor.

17. The computer storage medium of claim 15, wherein the inherited logical extent further comprises an LBA for data in a data region of a second ancestor of the child clone and a corresponding ID of the second ancestor, and
wherein the second ancestor is an ancestor of the first ancestor.

18. The computer storage medium of claim 15, wherein the local logical extent further comprises a snapshot ID of the child clone.

19. The computer storage medium of claim 15, wherein the inherited logical extent includes a history of all ancestors of the child clone.

20. The computer storage medium of claim 15, wherein the ancestor ID of the first ancestor comprises a universally unique identifier (UUID) of the first ancestor.

* * * * *